（12） United States Patent
Xu et al.

(10) Patent No.: US 11,311,914 B2
(45) Date of Patent: Apr. 26, 2022

(54) SINGLE-CHAIN DOUBLE-SUPPORTED FRUIT CUP DEVICE FOR SORTING FRUITS AND VEGETABLES

(71) Applicant: ZHEJIANG UNIVERSITY, Zhejiang (CN)

(72) Inventors: Huirong Xu, Zhejiang (CN); Han Chang, Zhejiang (CN); Yibin Ying, Zhejiang (CN); Xiuqin Rao, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 0 days.

(21) Appl. No.: 16/307,482

(22) PCT Filed: Apr. 25, 2018

(86) PCT No.: PCT/CN2018/084332

§ 371 (c)(1),
(2) Date: Nov. 28, 2020

(87) PCT Pub. No.: WO2019/174107
PCT Pub. Date: Sep. 19, 2019

(65) Prior Publication Data
US 2021/0086235 A1    Mar. 25, 2021

(30) Foreign Application Priority Data

Mar. 12, 2018    (CN) .......................... 201810201053.8

(51) Int. Cl.
*B07C 5/28*    (2006.01)
*B07C 5/22*    (2006.01)
*A23N 15/00*    (2006.01)

(52) U.S. Cl.
CPC ................ *B07C 5/22* (2013.01); *A23N 15/00* (2013.01); *B07C 5/28* (2013.01); *A23N 2015/008* (2013.01); *B07C 2501/009* (2013.01)

(58) Field of Classification Search
CPC .... B07C 5/22; B07C 5/28; B07C 5/16; A23N 15/00; B07B 13/08; B07B 13/16;
(Continued)

(56) References Cited

U.S. PATENT DOCUMENTS 5,230,394 A * 7/1993 Blanc ........................ B07C 5/18
177/145
5,280,838 A * 1/1994 Blanc .................... B65G 47/965
209/552
(Continued)

FOREIGN PATENT DOCUMENTS

| CN | 107462550 A | 12/2017 |
| JP | 2003211097 A | 7/2003 |
| NZ | 270117 A | 10/1996 |

*Primary Examiner* — Patrick H Mackey

(57) ABSTRACT

A single-chain double-supported fruit cup device for sorting fruits and vegetables includes: a single-chain double-supported fruit cup which is provided on a conveyor track; wherein the single-chain double-supported fruit cup comprises: a fruit cup support frame, a hood, an internal liner, a tray, a pallet and an inverted L-shaped pallet (13); wherein the pallets are symmetrically hinged on the cup support frame along both sides of the conveyor track, the tray is provided on the pallet, and a hood is mounted on the tray for placing a spherical fruit; two inverted L-shaped pallets are hinged on the fruit cup support frame along a front end face and a rear end face of a conveyor track, and the two inverted L-shaped pallets extend towards the pallet (5) on both sides and are cooperatedly connected.

13 Claims, 10 Drawing Sheets

(58) Field of Classification Search
CPC ...... B65G 47/40; B65G 47/96; B65G 47/962; B65G 47/965; B65G 17/16; B65G 2201/0211
USPC .............................................. 198/370.04, 959
See application file for complete search history.

(56) References Cited

U.S. PATENT DOCUMENTS

| | | | | |
|---|---|---|---|---|
| 6,234,297 | B1* | 5/2001 | Blanc | B65G 47/965 198/370.04 |
| 6,374,983 | B1* | 4/2002 | Morigi | B65G 47/965 198/370.04 |
| 9,527,113 | B2* | 12/2016 | Kennedy | B07B 13/08 |
| 2011/0309004 | A1* | 12/2011 | Morley | B65G 47/503 209/577 |
| 2019/0151903 | A1* | 5/2019 | Mcintyre | B07C 5/36 |

* cited by examiner

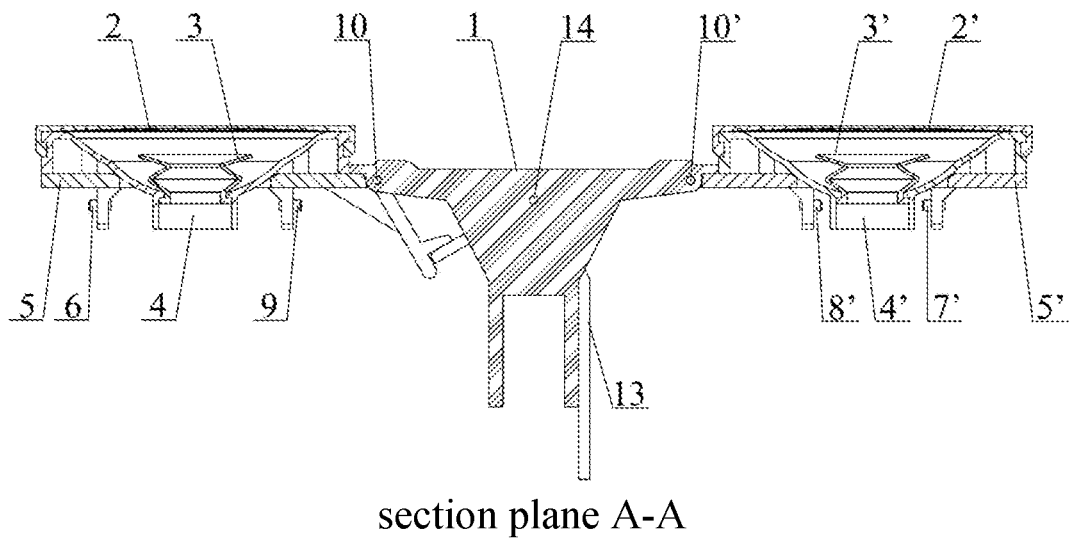
section plane A-A
Fig. 5
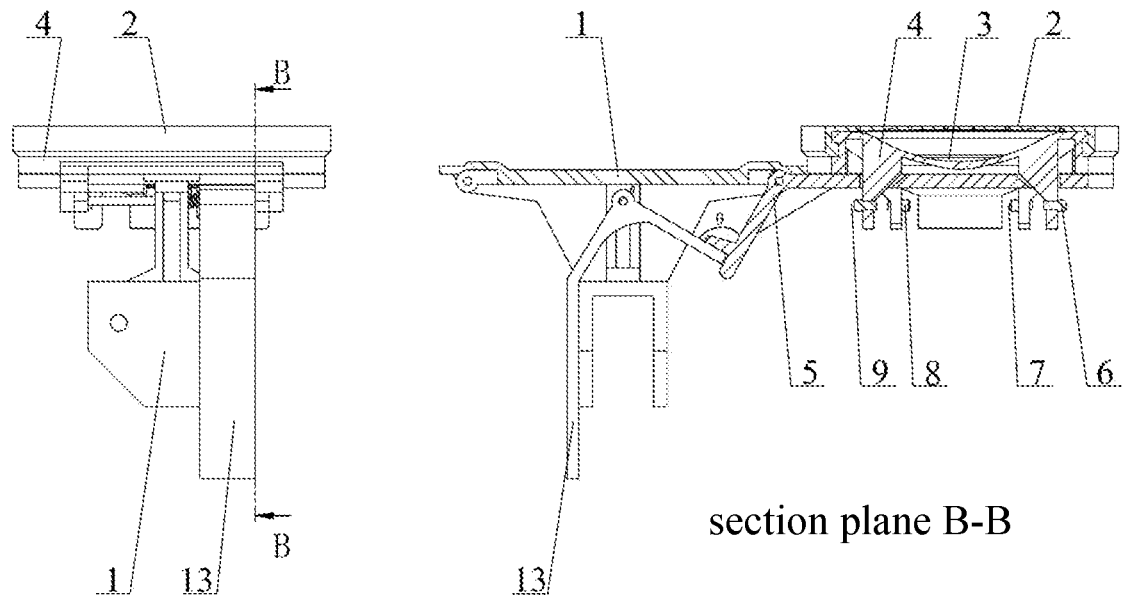
section plane B-B
Fig. 6(a)                    Fig. 6(b)

SINGLE-CHAIN DOUBLE-SUPPORTED FRUIT CUP DEVICE FOR SORTING FRUITS AND VEGETABLES

CROSS REFERENCE OF RELATED APPLICATION

This is a U.S. National Stage under 35 U.S.C 371 of the International Application PCT/CN2018/084332, filed Apr. 25, 2018, which claims priority under 35 U.S.C. 119(a-d) to CN 201810201053.8, filed Mar. 12, 2018.

BACKGROUND OF THE PRESENT INVENTION

Field of Invention

The present invention relates to a device for sorting fruits and vegetables, and more particular to a single-chain double-supported fruit cup device for sorting fruits and vegetables, which is mainly used for on-line detection and sorting of fruits and vegetables to improve production efficiency.

Description of Related Arts

China is a big producer of fruits and vegetables. There are many kinds of fruits and vegetables with high quality in China. With the continuous improvement of people's living standards, consumers' demand for high quality fruit and vegetable products is increasing. Although China is a big producer of fruits and vegetables, but China is not a production power. The post-harvest commercialization technology of fruits and vegetables relatively falls behind, the commodity of the fruits and vegetables in China is low, and the market competitiveness is weak. The application of online detection and grading technology is capable of classifying and grading fruits and vegetables according to different indicators and pricing according to quality. In the commercialization process of the quality detection and sorting of vulnerable fruits, trays are often utilized to transport fruits. The structure and related accessories of the tray is capable of effectively reducing the impact of ambient light on the spectral detection of fruits and vegetables, and trays are often used as a carrier in the dynamic weighing of fruits and vegetables.

SUMMARY OF THE PRESENT INVENTION

In order to solve the problems in the conventional arts, the present invention provides a single-chain double-supported fruit cup device for sorting fruits and vegetables, which is shielded from ambient light by a hood mounted on a tray and an internal liner. The limit pin on the weighing foot is used for the limit of the pallet, and the inverted L-shaped support plate is used for supporting the pallet. The fruit cup has a simple structure, ingeniously flipping and resetting, and can realize double channel detection and classification, thereby improving production efficiency.

Technical solutions adopted by the present invention are as follows.

The present invention provides a single-chain double-supported fruit cup device for sorting fruits and vegetables, comprising: a single-chain double-supported fruit cup which is provided on a conveyor track; wherein the single-chain double-supported fruit cup comprises: a fruit cup support frame, a hood, an internal liner, a tray, a pallet and an inverted L-shaped pallet;

wherein the pallets are symmetrically hinged on the cup support frame along both sides of the conveyor track, the tray is provided on the pallet, and a hood is mounted on the tray for placing a spherical fruit; two inverted L-shaped pallets are hinged on the fruit cup support frame along a front end face and a rear end face of a conveyor track, and the two inverted L-shaped pallets extend towards the pallet on both sides and are cooperatedly connected.

Preferably, the fruit cup support frame comprises a panel on a top portion and a base on a bottom; the two pallets are respectively hinged on two sides of the panel of the fruit cup support frame by corresponding side shafts; the two pallets are symmetrically provided along the fruit cup support frame; the side shafts respectively pass through a first side torsion spring, a second side torsion spring, a third side torsion spring and a fourth side torsion spring; wherein both sides of the first side torsion spring, the second side torsion spring, the third side torsion spring and the fourth side torsion spring are respectively connected with the two pallets and the panel (1a) of the fruit cup support frame.

Preferably, the two inverted L-shaped pallets are hinged on a middle portion of end faces of the panel of the fruit cup support frame by a same intermediate shaft; medium torsion springs are sleeved on the intermediate shaft between each of the inverted L-shaped support plate and the panel of the fruit cup support frame; both ends of the medium torsion springs are respectively connected with the panel of the support frame and the inverted L-shaped support plate.

Preferably, a top of the hood is mainly spliced by a plurality of fan-shaped shielding plates; the fan-shaped shielding plates form a circle to form a hollow torus; gaps are preset among adjacent fan-shaped shielding plates; a snap-type circular step groove is provided on a bottom of the hood; a convex matching with the snap-type circular step groove is provided on a top of the tray; the top of the tray is provided on a bottom portion of the hood to make the convex embedded in the snap-type circular step groove to form an axial limit.

Preferably, four weighing legs are provided on a lower end of the tray; four square holes ($5a$, $5b$, $5c$, $5d$) respectively corresponding to the four weighing legs are respectively provided on an upper portion of the pallet; when the lower portion of the tray is connected with the upper portion of the pallet, the four weighing legs respectively pass downwardly through corresponding four square holes to form locations for installing; after the four weighing legs pass through corresponding square holes, limit pins are installed on feed ends of the four weighing legs; sizes of the four square holes are smaller than the limit pins; a slope guide track provided in parallel with the conveyor track is provided on a lower portion of the pallets; two side faces of the slope guide track are inclined surfaces which are inclined downwardly, a top surface between the inclined surfaces is a plane, an orbital weigher is provided on the top surface; when the conveyor track transports the fruit cup support frame to move for driving the pallet to move above a top surface of the slope guide track, the weighing legs on the lower end of the tray are guided by the inclined surface of the slope guide track to raise a height, in such a manner that there is a vertical distance between the lower end of the tray and the upper end of the pallet; and the weighing legs fall on the orbital weigher, thereby realizing that the orbital weigher weighs and only weighs a weight of the hood, the internal liner, the tray and the spherical fruit.

Preferably, the pallet mainly comprises a circular pallet and a supporting leg which are in rigid connection; side shafts are provided on a connection of the supporting leg and the circular pallet; and the connection is hinged on the panel of the fruit cup support frame via the side pivots, the support leg and the circular pallets are connected at an obtuse angle;

wherein the inverted L-shaped support plate is mainly formed by rigidly connecting a support plate and a dial plate, and a intermediate rotating shaft is provided at a joint between the support plate and the dial plate; the joint is hinged to the panel of the fruit cup support frame through the intermediate shaft; the support plate and the dial plate are connected at an acute angle, and the dial plate is provided to extend to the pallet, and connected to the support leg of the pallet.

Preferably, the inverted L-shaped support plate is only subjected to gravity torque, the dial plate is in close contact with a vertical side face of the base of the fruit cup support frame, and an end portion of the support plate is connected to a portion between an intermediate branch arm of the support leg and a short arm of the main body portion; and a surface of the support plate and the intermediate branch arm surface of the support leg are in close contact with each other, in such a manner that the support plate supports the support leg; an angle θ formed by the support plate and a main portion of the support leg is greater than 90°, and the circular pallet is arranged in a horizontal state.

when the inverted L-shaped support plate is subjected to an anti-gravity torque, the dial rotates away from a vertical side face of the base of the fruit cup support, and the support plate rotates away from the support leg; the circular support plate tilts and reverses under action of its own gravity torque and gravity torque of the tray (4), the internal liner, the hood and the spherical fruit; the spherical fruit on the circular support plate is dropped sideways to achieve grading the spherical fruit.

Preferably, when the inverted L-shaped support plate is restored by its own gravity torque after being subjected to the anti-gravity torque, the surface of the dial plate is connected to the short arm of a main body portion of the support leg, and the support leg is pressed onto a bottom surface of the panel of the fruit cup support frame.

Preferably, the side torsion springs provide the pallets with a torque in an opposite direction to the gravity (G1) torque during articulation rotation, thereby realizing a result that rotation overturning process against gravity (G1) of the pallets is gentle.

Preferably, the medium torsion spring provides the inverted L-shaped support plate with an identical direction of gravity as a gravity (G2) torque during the articulation rotation, and realizes that rotation overturning process against gravity (G1) of the inverted L-shaped support plate is gentle.

Preferably, the conveyor track comprises a transmission chain, a track, a track profile and an orbital weigher; and the track is fixedly provided on the track profile, and the transmission chain is mounted on the track and moved along the track, the base of the fruit cup support frame is mounted and connected to the transmission chain, and the fruit chain support frame is driven by the transmission chain, and thereby driving transmission of the single-chain double-supported fruit cup.

Preferably, a section of the transmission chain located at a grading outlet position is provided with an electromagnetic dialing assembly; the electromagnetic dialing assembly comprises an electromagnet and a grading plate, wherein the electromagnet is connected with the grading plate, and the electromagnet controls the rotation of the classifying plate to push the inverted L-shaped support plate to rotate against the torque generated by self-gravity torque and rotation torsion formed by rotation of the medium torsion spring.

Preferably, in a section of the transmission chain located below the conveying production line, a reset slope plate is arranged above a middle portion, and the fruit cup inclined by the dial plate is inverted after entering the conveying production line, and the inverted tray and the pallet are advanced along the slope surface of the reset slope plate to overcome torque of the medium torsion spring for restoring to a horizontal state.

The material of the hood is rubber.

The present invention has beneficial effects as follows.

The invention separates the tray and the pallet, and a cross-sectional area of the weighing leg of the tray is smaller than a cross-sectional area of the square holes of the pallet, which can reduce the friction effect of the weighing process of the fruits and vegetables, and improve the weighing precision of the fruits and vegetables.

A hood and an internal liner are mounted on the tray, which can effectively reduce the influence of light leakage and ambient light on the spectral detection of fruits and vegetables, and improve the accuracy of spectral detection;

The combination of the inverted L-shaped support plate and the torsion spring improves the turning efficiency of the pallet and the tray, and the turning effect is good. The fruit cup is single-chain conveying and has two rows of trays, which can effectively improve the production efficiency.

BRIEF DESCRIPTION OF THE DRAWINGS

FIG. 5 is an A-A sectional view of the FIG. 4.

FIG. 6(a) is a left view of a single-sided fruit cup of the present invention.

FIG. 6(b) is a B-B sectional view of FIG. 6(a).

In the FIGS.: 1—fruit cup support frame; 1a—panel; 1b—base; 2—hood; 2a—fan-shaped shielding plate; 2b—snap-type circular step groove; 3—internal liner; 4—tray; 4a—first weighing leg; 4b—second weighing leg; 4c—third weighing leg; 4d—fourth weighing leg; 5—pallet; 5a—square hole; 5b—square hole; 5c—square hole; 5d—square hole; 5e—support leg; 5f—round support; 6—first limit pin; 7—second limit pin; 8—third limit pin; 9—fourth limit pin; 10—side shaft; 11—first side torsion spring; 12—second side torsion spring; 13—inverted L-shaped pallet; 13a—pallet; 13b—dial plate; 14—intermediate shaft; 15—medium torsion spring; 16—graded plate; 17—electromagnet; 18—spherical fruit; 19—transmission chain; 20—track; 21—track profile; 22—orbital weigher; 23—light source; 24, spectrum detection probe; 25—reset slope plate; G1—gravity carried by the pallet; G2—gravity carried by the inverted L-shaped pallet; θ-included angle between the inverted L-shaped pallet and the support leg of the pallet; A-spectrum detection station; B-track weighing station; C-graded station; D-reset station.

Note: Elements with "'" in the FIGS. are symmetrical parts of elements without "'".

DETAILED DESCRIPTION OF THE PREFERRED EMBODIMENT

Further description of the present invention is illustrated combining with the accompanying drawings and the preferred embodiments.

Figure 1:
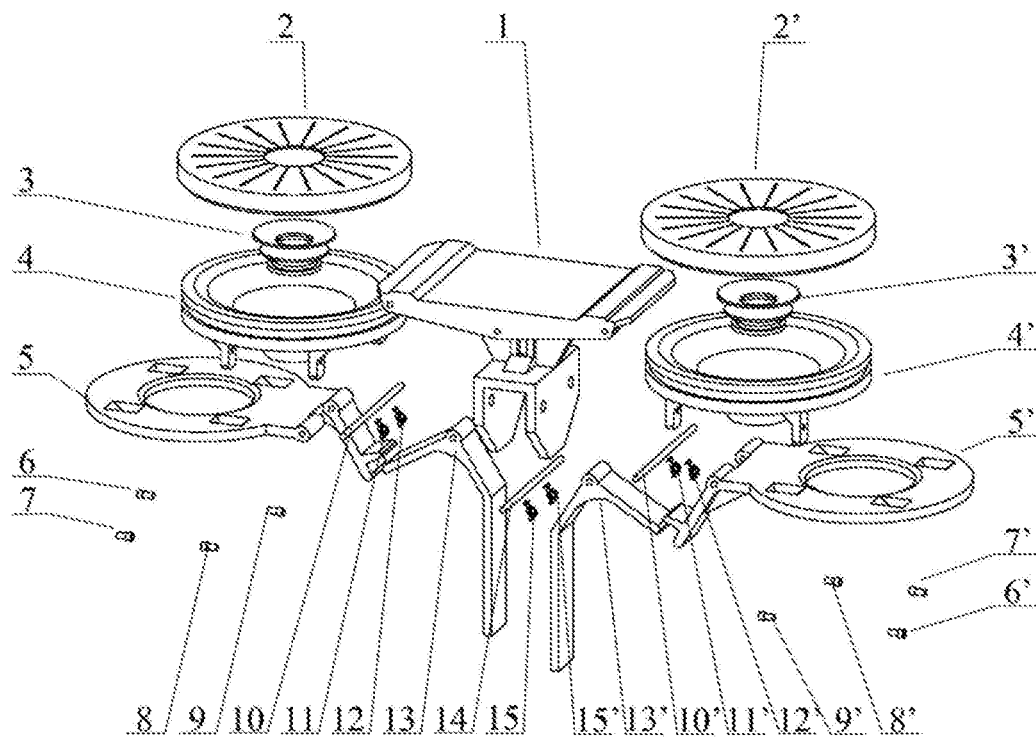
FIG. 1 is an overall exploded view of the present invention.

As shown in FIG. 1, according to a preferred embodiment of the present invention, the present invention provides a single-chain double-supported fruit cup device for sorting fruits and vegetables, comprising: a single-chain double-supported fruit cup which is provided on a conveyor track; wherein the single-chain double-supported fruit cup comprises: a fruit cup support frame (1), a hood (2), an internal liner (3), a tray (4), a pallet (5) and an inverted L-shaped pallet (13);

wherein the pallets (5) are symmetrically hinged on the cup support frame (1) along both sides of the conveyor track, the tray (4) is provided on the pallet (5), and a hood (2) is mounted on the tray (4), and the shade is shielded; a spherical fruit is placed on the cover (2); the fruit cup support frame (1) is hinged with an inverted L-shaped pallet (13, 13') along the front and rear end faces of the transfer rail, and two inverted L-shaped pallets (13, 13') extend to the brackets (5) on both sides and connect them.

Figures 8A, 8B:
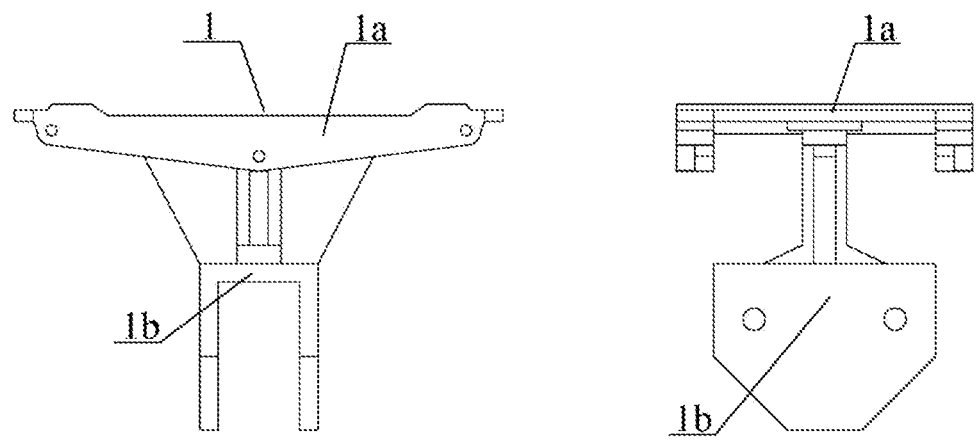
FIG. 8(a) is a front view of a support frame.
FIG. 8(b) is a left view of the support frame.
Figure 13:
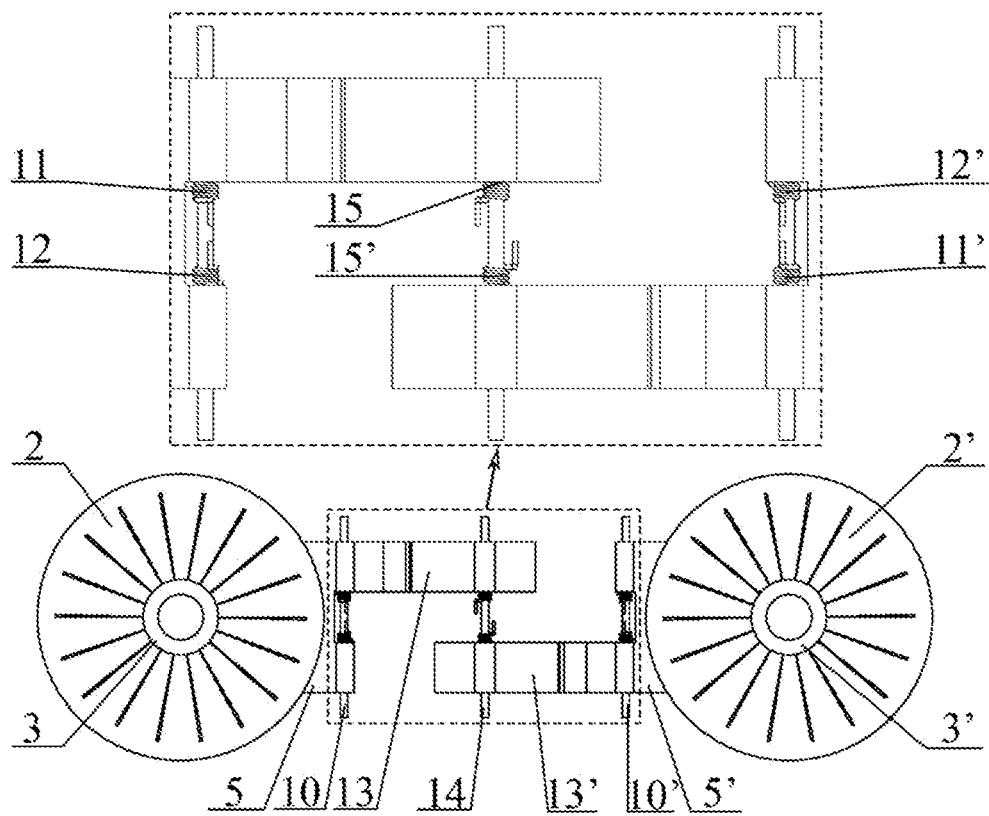
FIG. 13 is a partial enlarged view of a torsion spring assembly of the present invention.

As shown in FIGS. 8(a) and 8(b), the fruit cup support frame (1) comprises a panel (1a) on a top portion and a base (1b) on a bottom. As shown in FIG. 1 and FIG. 13, the two pallets (5, 5') are respectively hinged on two sides of the panel (1a) of the fruit cup support frame (1) by corresponding side shafts (10, 10'); the two pallets (5, 5') rotates and are turned over around corresponding side shafts (10, 10'); the two pallets (5, 5') are symmetrically provided along the fruit cup support frame (1); the side shafts (10, 10') respectively pass through a first side torsion spring (11), a second side torsion spring (12), a third side torsion spring (11') and a fourth side torsion spring (12'); wherein both sides of the first side torsion spring (11), the second side torsion spring (12), the third side torsion spring (11') and the fourth side torsion spring (12') are respectively connected with the two pallets (5, 5') and the panel (1a) of the fruit cup support frame (1).

Figure 2:
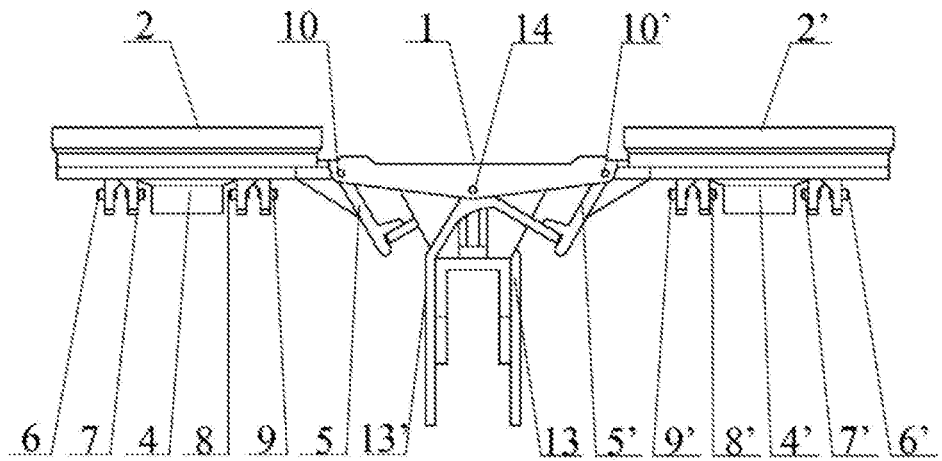
FIG. 2 is a front view of a horizontal state of the present invention.
Figure 3:
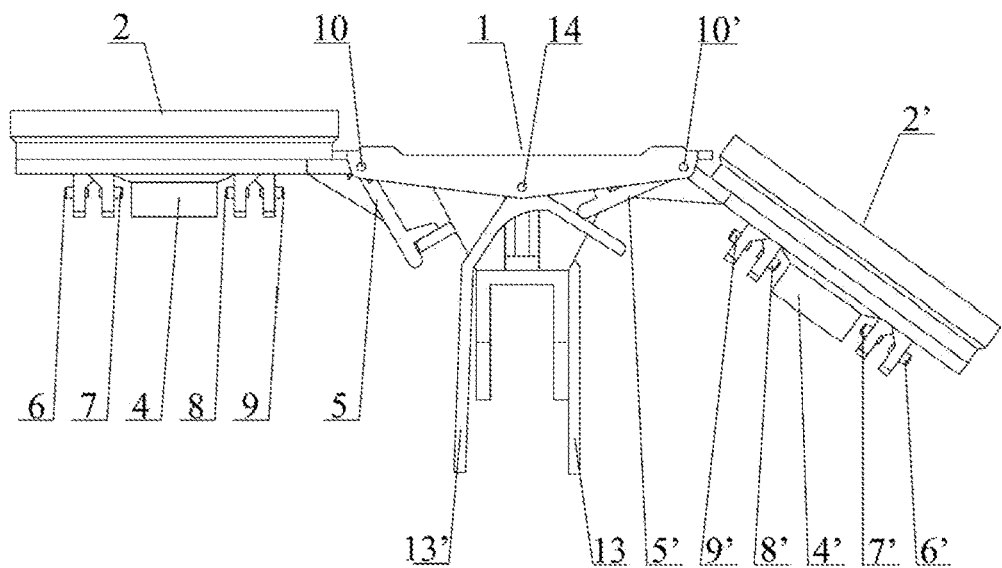
FIG. 3 is a front view showing a one-sided rollover state of the present invention.
Figure 4:
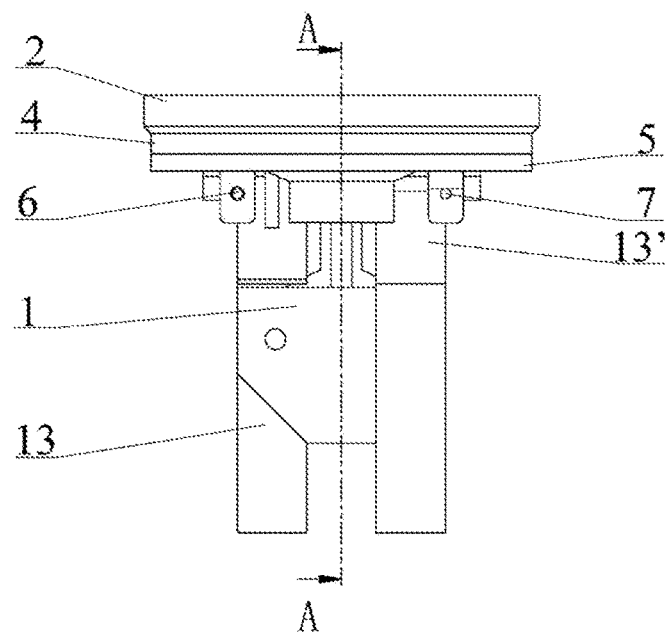
FIG. 4 is a left view of the present invention.

As shown in FIGS. 1-3, the two inverted L-shaped pallets (13, 13') are hinged on a middle portion of end faces of the panel (1a) of the fruit cup support frame (1) by a same intermediate shaft (14); the inverted L-shaped support plates (13, 13') are respectively rotated and flipped around the intermediate shaft (14). As shown in FIG. 1 and FIG. 13, medium torsion springs (15, 15') are sleeved on the intermediate shaft (14) between each of the inverted L-shaped support plate (13, 13') and the panel (1a) of the fruit cup support frame (1). Both ends of the intermediate shaft (14) project from through holes in a middle portion of the end surface of the panel 1a of the cup support frame 1 and pass through the respective medium torsion springs 15, 15' and are sleeved into the through holes of the inverted L-shaped support plates 13, 13'. Both ends of the medium torsion springs (15, 15') are respectively connected with the panel (1a) of the support frame (1) and the inverted L-shaped support plate (13, 13').

As shown in FIGS. 1-4, the hood 2 is mounted on the tray 4 through the internal liner 3 at a bottom, and the internal liner 3 is located in the internal circular hole in the center of the tray 4. The hood 2, the internal liner 3, the tray 4, and the pallet 5 are all provided with a circular hole in a respective center, and after the hood 2, the internal liner 3, the tray 4, and the pallet 5 are assembled, the circular holes are concentric.

As shown in FIG. 5-7, a lower part of the tray 4 is hollow to reduce weight of the tray 4. A concave shape of the tray 4 is in a shape of a bowl, and the concave surface is composed of a plurality of concave surfaces of different curvatures, and is suitable for carrying spherical agricultural products.

Figure 9A:
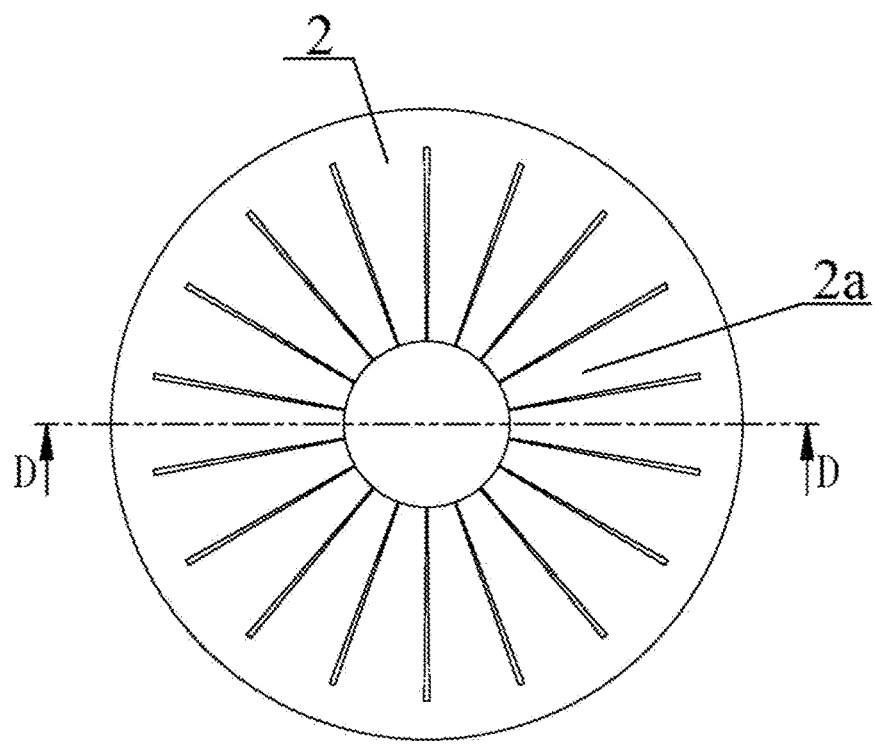
FIG. 9(a) is a top view of a hood.
Figure 9B:
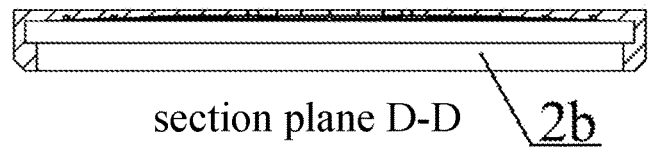
FIG. 9(b) is a D-D sectional view of FIG. 9(a).

As shown in FIGS. 9(a) and (b), a top of the hood (2) is mainly spliced by a plurality of fan-shaped shielding plates (2a); the fan-shaped shielding plates (2a) form a circle to form a hollow torus; gaps are preset among adjacent fan-shaped shielding plates (2a); so as to make the hood 2 more easily fit a shape of the spherical fruit 18, and to minimize the leakage of ambient light; a snap-type circular step groove (2b) is provided on a bottom of the hood (2); the snap-type circular stepped groove 2b is a stepped structure in which the inner end has a larger diameter and the outer end has a smaller diameter. a convex matching with the snap-type circular step groove (2b) is provided on a top of the tray (4); the top of the tray (4) is provided on a bottom portion of the hood (2) to make the convex embedded in the snap-type circular step groove (2b) to form an axial limit.

The upper end of the tray 4 is provided with a boss at the upper end of the round hole, and a cylindrical groove is provided on an external of the internal liner. The upper end of the round hole cooperates with the cylindrical groove to fix the inner pad 3.

Figures 10A, 10B:
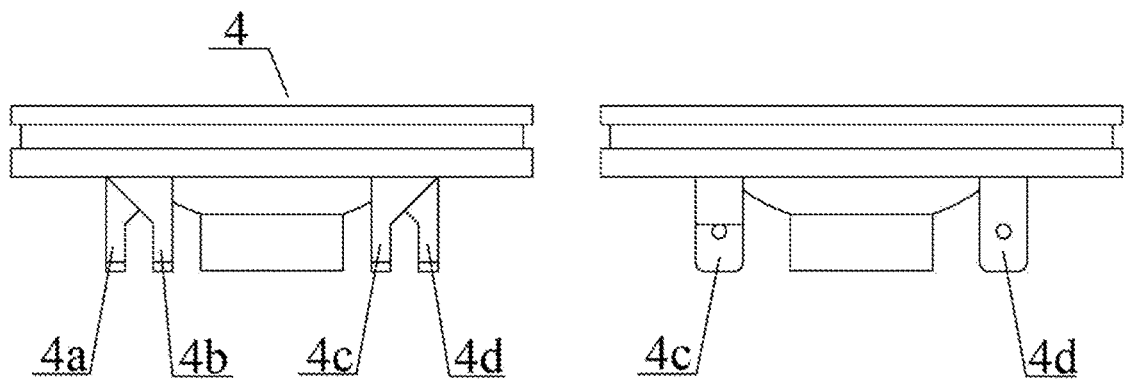
FIG. 10(a) is a front view of a tray.
FIG. 10(b) is a left view of the tray.
Figure 11A:
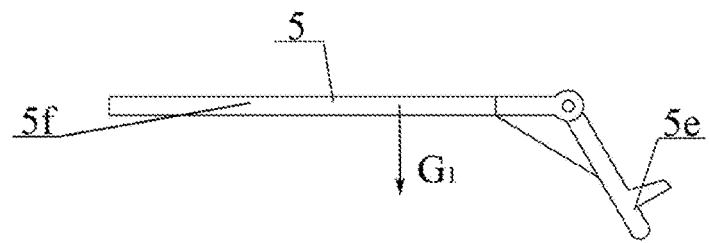
FIG. 11(a) is a front view of a pallet.
Figure 11B:
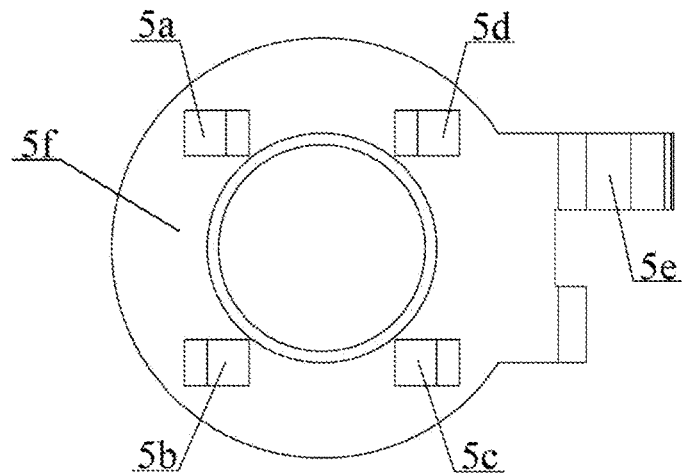
FIG. 11(b) is a left view of the pallet.

As shown in FIG. 10(a) and FIG. 10(b), four weighing legs 4a, 4b, 4c, 4d are connected to the lower end of the tray 4, wherein the weighing legs 4a, 4d are close to the outside of the tray 4, and the weighing legs 4b, 4c are close to an internal side of the tray 4. As shown in FIG. 11(a) and FIG. 11(b), four square holes (5a, 5b, 5c, 5d) respectively corresponding to the four weighing legs (4a, 4b, 4c, 4d) are respectively provided on an upper portion of the pallet (5); when the lower portion of the tray (4) is connected with the upper portion of the pallet (5), the four weighing legs (4a, 4b, 4c, 4d) respectively pass downwardly through corresponding four square holes (5a, 5b, 5c, 5d) to form locations for installing; after the four weighing legs (4a, 4b, 4c, 4d) pass through corresponding square holes (5a, 5b, 5c, 5d), limit pins (6, 7, 8 and 9) are installed on feed ends of the four weighing legs (4a, 4b, 4c, 4d); sizes of the four square holes (5a, 5b, 5c, 5d) are smaller than the limit pins (6, 7, 8 and 9); the four limit pins 6, 7, 8, 9 can prevent the weighing legs 4a, 4b, 4c, 4d from being separated from the square holes 5a, 5b, 5c, 5d on the pallet 5.

Figure 16:
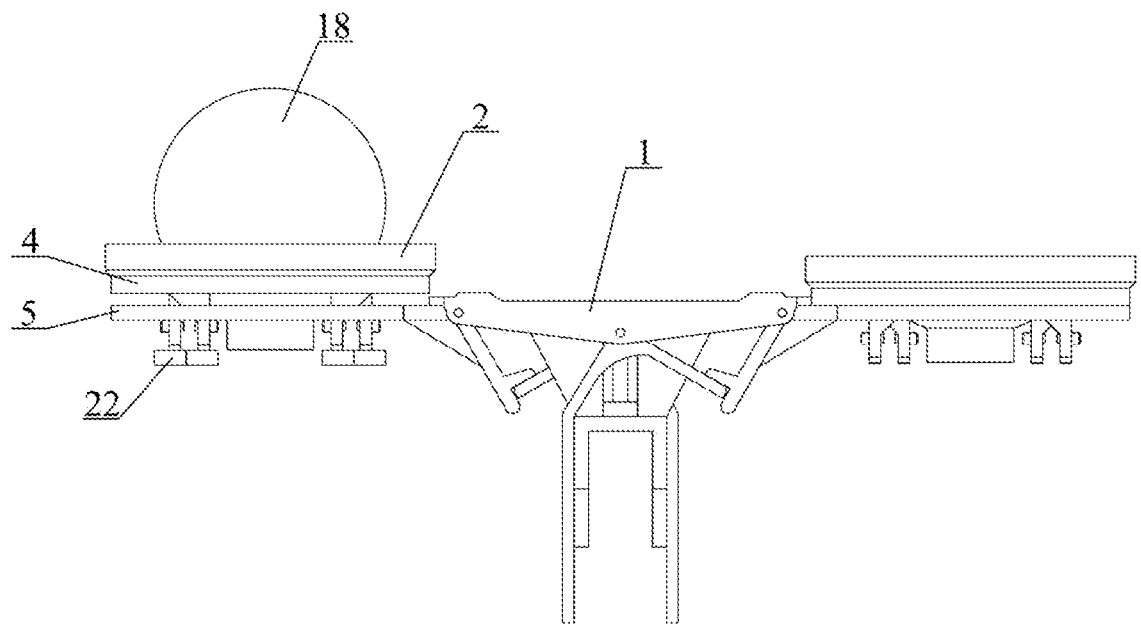
FIG. 16 is a front view showing the fruit cup passing through a weighing track of the present invention.
Figure 17:
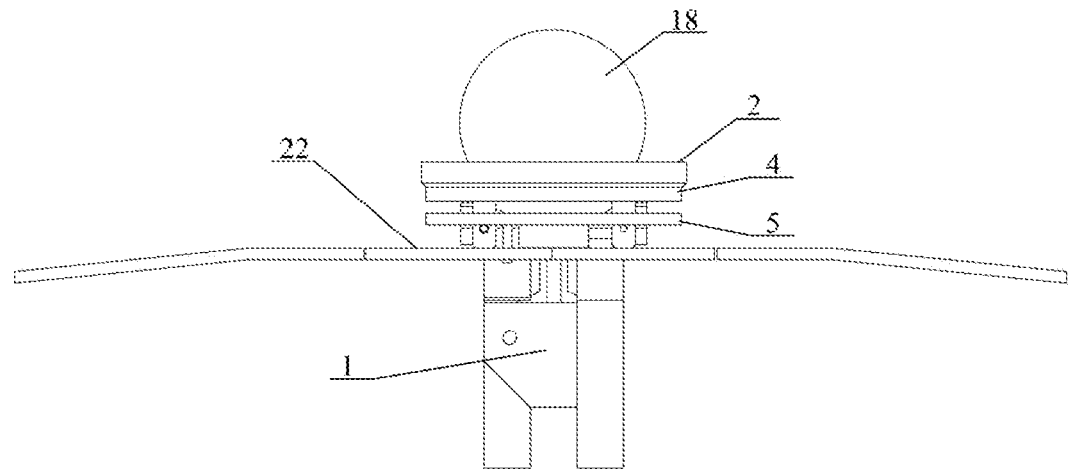
FIG. 17 is a side view showing the fruit cup passing through the weighing track of the present invention.

As shown in FIG. 16 and FIG. 17, a slope guide track provided in parallel with the conveyor track is provided on a lower portion of the pallets (5); two side faces of the slope guide track are inclined surfaces which are inclined downwardly, a top surface between the inclined surfaces is a plane, an orbital weigher (22) is provided on the top surface; when the conveyor track transports the fruit cup support frame (1) to move for driving the pallet (5) to move above a top surface of the slope guide track, the weighing legs (4a, 4b, 4c, 4d) on the lower end of the tray (4) are guided by the inclined surface of the slope guide track to raise a height, in such a manner that there is a vertical distance between the lower end of the tray (4) and the upper end of the pallet (5); and the weighing legs (4a, 4b, 4c, 4d) fall on the orbital weigher (22), thereby realizing that the orbital weigher (22) weighs and only weighs a weight of the hood (2), the internal liner (3), the tray (4) and the spherical fruit (18).

As shown in FIG. 11(a), the pallet (5) mainly comprises a circular pallet (5f) and a supporting leg (5e) which are in rigid connection; side shafts (10, 10') are provided on a connection of the supporting leg (5e) and the circular pallet (5f); and the connection is hinged on the panel (1a) of the fruit cup support frame (1) via the side pivots (10, 10'), The support leg 5e and the circular pallet 5f are in non-parallel installation, and the support leg (5e) and the circular pallets (5f) are connected at an obtuse angle. The support leg 5e comprises a main body portion and a middle branch arm, wherein the main body portion is formed by a long arm and a short arm connected in a straight line, the intermediate branch arm is connected to a joint between the long arm and the short arm, and the long arm is connected to the circular pallet 5f.

The circular pallet 5f is provided with four square holes 5a, 5b, 5c, 5d for passing through the four weighing legs 4a, 4b, 4c, 4d on the bottom surface of the tray 4, wherein the square holes 5a, 5d are close to the outer side of the circular pallet 5f' and the square holes 5b, 5c are close to the inner side of the circular pallet 5f. Sectional areas of the square holes 5a, 5b, 5c, 5d are larger in size than the weighing legs 4a, 4b, 4c, 4d; on a lower portion of the tray 4 to avoid frictions between the weighing legs 4a, 4b, 4c, 4d of the tray 4 and the square holes 5a, 5b, 5c, 5d of the circular pallet 5f during weighing by the orbital weigher 22, making the orbital weigher 22 accurately in weighing.

Figure 12:
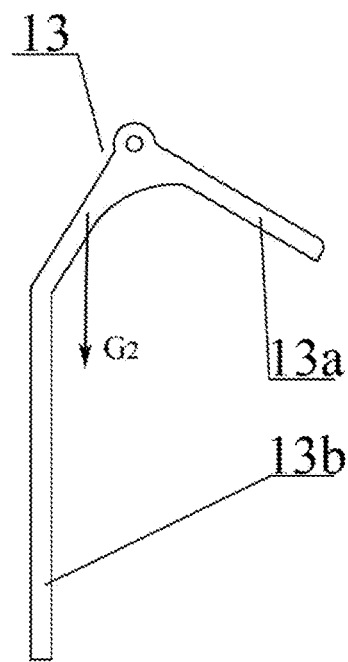
FIG. 12 is a front view of a driving lever of the present invention.

As shown in FIG. 12, the inverted L-shaped support plate (13) is mainly formed by rigidly connecting a support plate (13a) and a dial plate (13b), and a intermediate rotating shaft (14) is provided at a joint between the support plate (13a) and the dial plate (13b); the joint is hinged to the panel (1a) of the fruit cup support frame (1) through the intermediate shaft (14); the support plate (13a) and the dial plate (13b) are connected at an acute angle, and the dial plate (13b) is provided to extend to the pallet (5), and connected to the support leg (5e) of the pallet (5).

As shown in FIG. 5, FIG. 6(a) and FIG. 6(b), when the inverted L-shaped support plate (13) is only subjected to gravity torque, the dial plate (13b) is in close contact with a vertical side face of the base (1b) of the fruit cup support frame (1), and an end portion of the support plate (13a) is connected to a portion between an intermediate branch arm of the support leg (5e) and a short arm of the main body portion; and a surface of the support plate (13a) and the intermediate branch arm surface of the support leg (5e) are in close contact with each other, in such a manner that the support plate (13a) supports the support leg (5e); an angle θ formed by the support plate (13a) and a main portion of the support leg (5e) is greater than 90°, and the circular pallet (5f) is arranged in a horizontal state.

When the inverted L-shaped support plate (13) is subjected to an anti-gravity torque, the dial (13b) rotates away from a vertical side face of the base (1b) of the fruit cup support (1), and the support plate (13a) rotates away from the support leg (5e); the circular support plate (5f) tilts and reverses under action of its own gravity torque and gravity torque of the tray (4), the internal liner (3), the hood (2) and the spherical fruit (18); the spherical fruit (18) on the circular support plate (5f) is dropped sideways to achieve grading the spherical fruit (18).

Figures 7A, 7B:
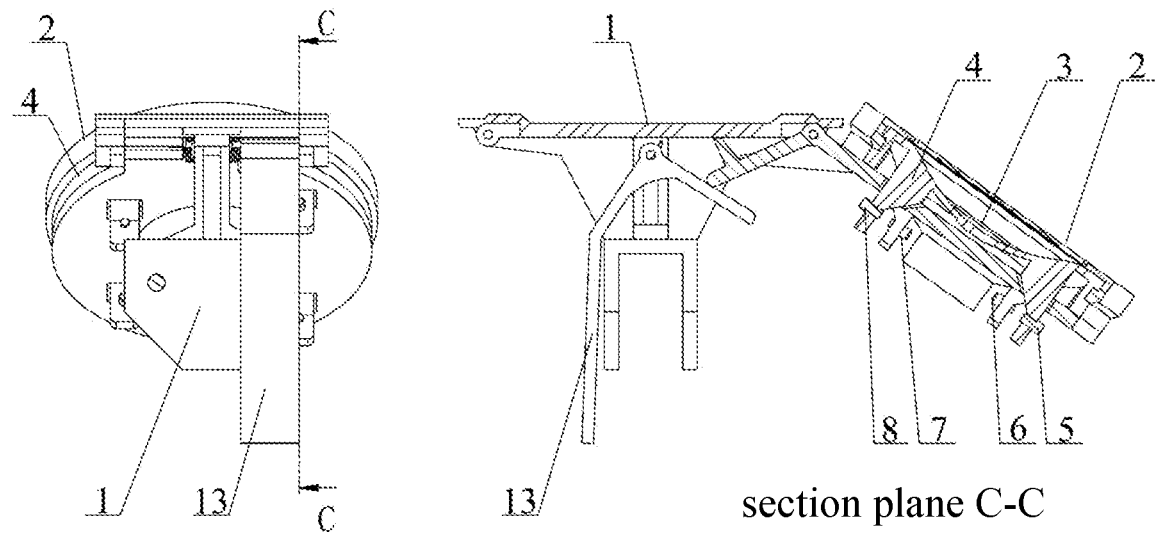
FIG. 7(a) is a left view showing a rollover state of a one-sided fruit cup of the present invention.
FIG. 7(b) is a C-C cross-sectional view of FIG. 7(a).

Preferably, when the inverted L-shaped support plate (13) is restored by its own gravity torque after being subjected to the anti-gravity torque, the surface of the dial plate (13b) is connected to the short arm of a main body portion of the support leg (5e), and the support leg (5e) is pressed onto a bottom surface of the panel (1a) of the fruit cup support frame (1), which is as shown in FIGS. 7(a) and 7(b).

Thereby, the support leg 5e and the inverted L-shaped support plate 13 are matched to achieve the horizontal support and rollover of the single-chain double-supported fruit cup.

The side torsion springs (11, 12, 11',12') provide the pallets (5, 5') with a torque in an opposite direction to the gravity (G1) torque during articulation rotation. The torque is smaller than a sum of the gravity torque of the tray 4, the inner liner 3, and the hood 2, and is greater than the gravity torque of the pallet 5, thereby realizing a result that rotation overturning process against gravity (G1) of the pallets (5, 5') is gentle. In a natural state, the gravity G1 torque of the pallets 5, 5' causes the circular pallet 5f of the pallets 5, 5' to be turned down horizontally.

The medium torsion spring (15, 15') provides the inverted L-shaped support plate (13, 13') with an identical direction of gravity as a gravity (G2) torque during the articulation rotation, the torque is less than twice the gravity torque of the inverted L-shaped support plate 13 and greater than the gravity torque of the inverted L-shaped support plate 13, and so as to realize that rotation overturning process against gravity (G1) of the inverted L-shaped support plate (13, 13)') is gentle. In a natural state, the gravity G2 torque of the inverted L-shaped support plates 13, 13' causes the dial 13b of the inverted L-shaped support plates 13, 13' to rotate toward the center of the base 1b of the fruit cup support frame 1.

In the horizontal state of the circular pallet 5f of the pallets 5, 5', the side torsion springs 11, 12, 11',12' and the medium torsion springs 15, 15' are in a state in which no torque is provided. During a turnover process of the pallets 5, 5', the side torsion springs 11, 12, 11',12' and the medium torsion springs 15, 15' all provide torque.

Figure 15:
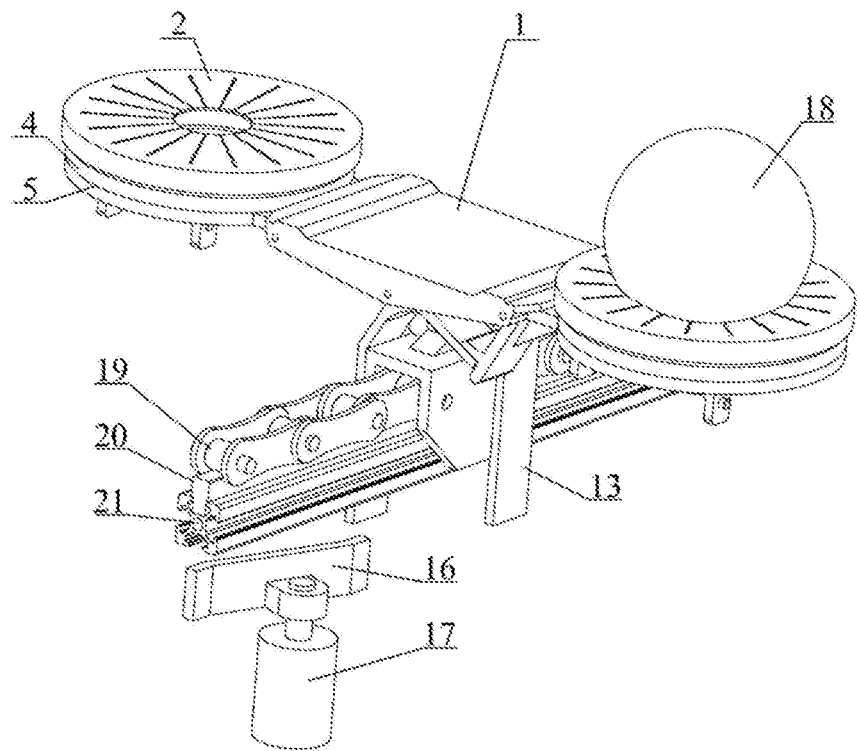
FIG. 15 is an isometric view of the assembly of the present invention.

As shown in FIG. 15, the conveyor track comprises a transmission chain (19), a track (20), a track profile (21) and an orbital weigher (22); and the track (20) is fixedly provided on the track profile (21), and the transmission chain (19) is mounted on the track (20) and moved along the track (20), the base (1b) of the fruit cup support frame (1) is mounted and connected to the transmission chain (19), and the fruit chain support frame (1) is driven by the transmission chain (19), and thereby driving transmission of the single-chain double-supported fruit cup.

Figure 14:
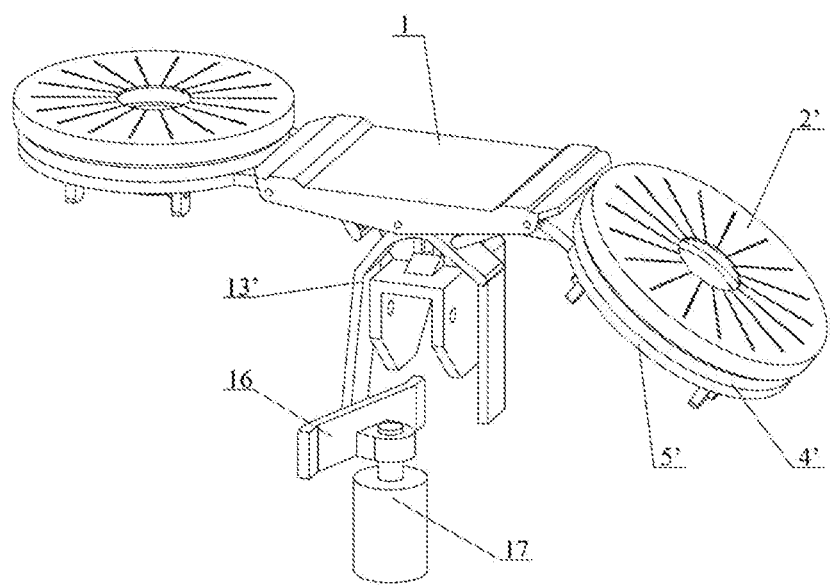
FIG. 14 is an isometric view of a fruit cup and a classification mechanism of the present invention.

As shown in FIG. 14, the side of the transmission chain 19 is provided with an electromagnetic plucking assembly, and the electromagnetic plucking assembly comprises an electromagnet 17 grading plate 16, and the electromagnet 17 is connected with the grading plate 16, and the grading plate 16 has vertical planes at both ends. The middle is a vertical plate surface formed by a vertical inclined surface. When the classifying plate 16 is horizontally rotated to be in contact with the dial plate 13b of the inverted L-shaped support plate 13, the dial 13b of the inverted L-shaped support plate 13 moves along the outer vertical surface of the classifying plate 16. The rotation of the classifying plate 16 is realized by the electromagnet 17, which controls the rotation of the classifying plate 16 to push the dial 13b of the inverted L-shaped support plates 13, 13' to rotate against its own gravity torque. When the single-chain double tray type fruit cup is transported through the electromagnetic shifting assembly in the conveying track, the dialing plate 13b is rotated by the dividing plate 16 to the outside, and the circular pallet 5f of the tray 5 is turned over.

Figure 18:
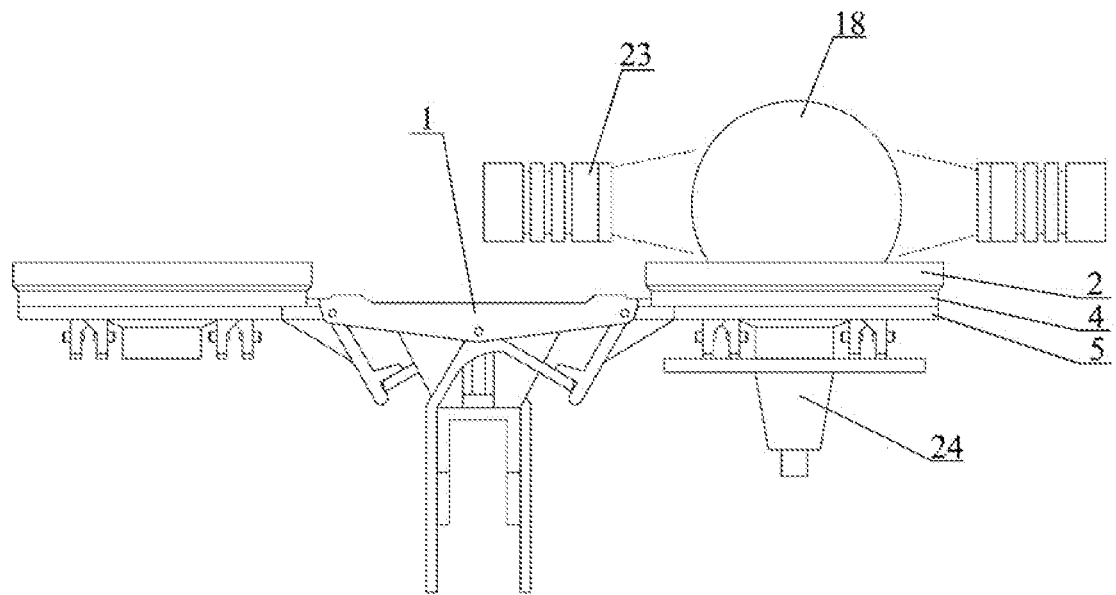
FIG. 18 is a schematic view showing the fruit cup passing through a spectrum detection station of the present invention.

As shown in FIG. 18, a spectral detecting probe 24 is installed at a hole reserved at the bottom of the tray 4, and a light source 23 is disposed on both sides of the hood 2.

The specific working process of the present invention is as follows.

Figure 20:
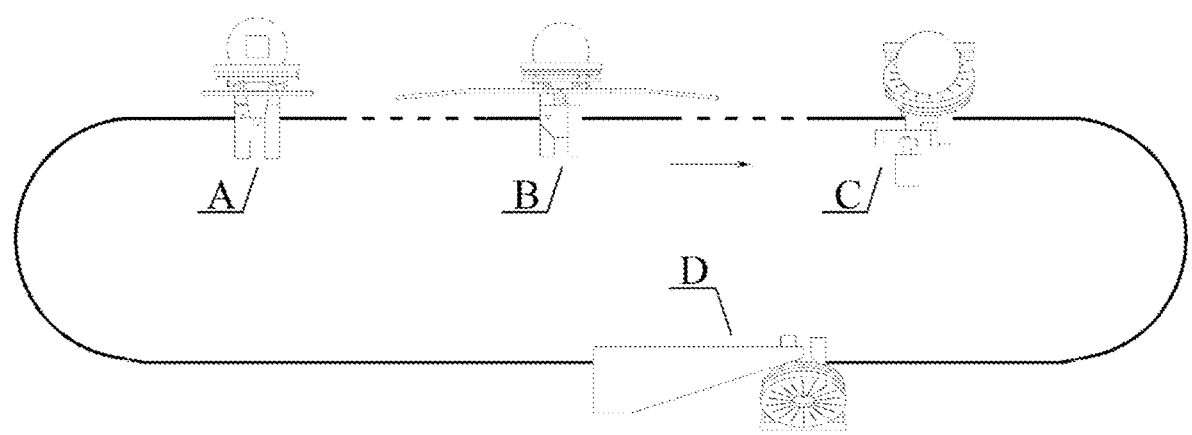
FIG. 20 is a schematic view of a conveyor production line of the present invention.

As shown in FIG. 20, the fruit cup 18 for supporting the spherical fruit sequentially passes through a spectrum detecting station A, a rail type weighing station B, a grading station C, and a transmission chain with the fruit chain to rotate below the conveying line with the transmission chain. After inverted, the fruit cup enters a reset station D.

As shown in FIG. 18, when the fruit cup enters the spectrum detecting station A, the circular hole reserved by the tray 4 passes through the spectrum detecting probe 24, and the quasi-spherical fruit 18 is irradiated by the two side light sources 23, and the spectrum detecting probe 24 starts. The spectral information of the spherical fruit 18 is recorded, and the hood 2 and the inner liner 3 mounted on the tray 4 can greatly reduce the light and ambient light leaked by the light source 23, and reduce the influence of the ambient light on the spectral detection accuracy.

As shown in FIG. 16, when the fruit cup enters the orbital weighing station B, the weighing legs 4a, 4b, 4c, 4d of the tray 4 enter the weighing track 22, and there is a certain gap between the tray 4 and the pallet 5 at this time. According to the structural design, the square holes 5a, 5d of the pallet 5 can be contacted with the weighing legs 4a, 4d of the tray 4, and the square holes 5b, 5c of the pallet 5 are not in contact with the weighing legs 4b, 4c of the tray 4, The thrust force of advancement of the tray 4 comes from the thrust of the square holes 5a, 5d of the pallet 5 against the weighing legs 4a, 4d of the tray 4, and in this state, the friction between the pallet 5 and the tray 4 is minimized, which can be minimized. The friction between the pallet 5 and the tray 4 is aligned with the effect of the orbital weighing accuracy of the spherical fruit 18.

As shown in FIG. 17, under the pallet 5, a slope guiding track is provided parallel to the conveying track. The two side faces of the slope guiding track are inclined faces inclined downward, and the top surface between the inclined faces on both sides is flat, and the top surface is installed. There is a track type weighing device 22; when the conveying track transports the cup support 1 to move and drives the plate 5 to move over the top surface of the slope guiding track, the weighing legs 4a, 4b, 4c, 4d at the lower end of the tray 4 are subjected to the slope. The inclined surface of the guiding track is guided to raise the height so that there is a vertical distance between the lower end of the tray 4 and the upper end of the pallet 5, and the weighing feet 4a, 4b, 4c, 4d fall on the rail type weighing device 22, thereby realizing the orbital weighing device 22 weighs and weighs only the weight of the hood 2, the inner liner 3, the tray 4, and spherical fruit 18.

As shown in FIG. 6, FIG. 7, FIG. 14, FIG. 15, when the fruit cup enters the grading station C, the electromagnet 17 rotates the classification plate 16 to the outside at the corresponding classification outlet, and the fruit cup is inverted L-shaped support plate 13 at this time. The dial 13b travels along the vertical slope of the outer side of the classifying plate 16 and gradually slopes. When the inverted L-shaped support plate 13 is tilted to a certain angle, the support plate 13a of the inverted L-shaped support plate 13 and the support 5 of the pallet 5 are supported. Separating, the pallet 5 is inclined, and the quasi-spherical fruit 18 is rolled from the tray 4 to the corresponding classification port. After the classification is completed, the support leg 13a of the inverted L-shaped support plate 13 supports the lower surface of the support 5e of the pallet 5.

Figure 19:
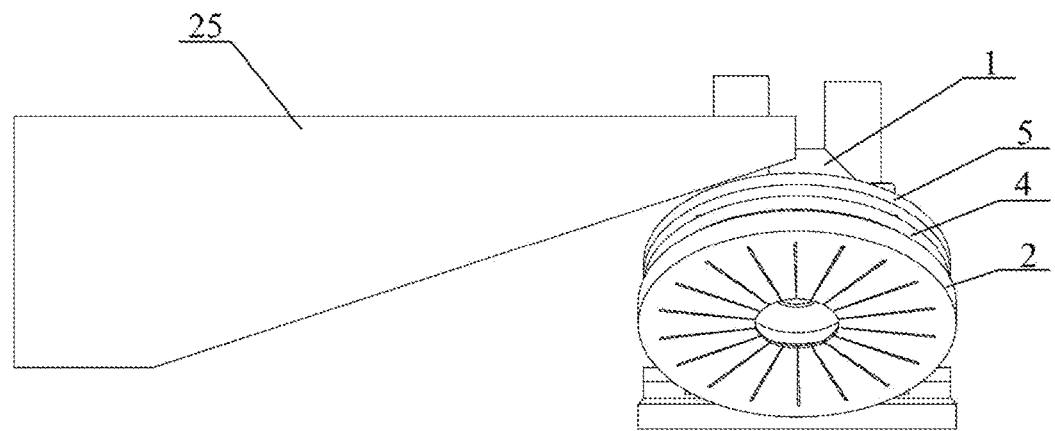
FIG. 19 is a schematic view showing the fruit cup passing through a resetting station of the present invention.

As shown in FIG. 19, when the fruit cup rotates below the conveying line with the drive chain, the fruit cup is inverted, and a reset ramp plate 25 is disposed above the fruit cup drive chain 19 below the conveying line, and when the fruit cup enters the resetting station D, The finished graded fruit cup in the inverted state enters the reset ramp plate 25, and the tray 4 weighing legs (4a, 4b, 4c, 4d) and the intermediate cylinder lower end and the outer edge of the pallet 5 travel along the slope surface of the reset ramp plate 25, The inclination angle of the pallet 5 becomes smaller, and the support 5e of the pallet 5 is lifted up to support the support plate 13a of the L-shaped support plate 13, and when the end of the support 5e of the pallet 5 is just passed through the support plate of the inverted L-shaped support plate 13 At the end of 13a, the support plate 13a of the inverted L-shaped support plate 13 is returned to the state in contact with the support 5e of the pallet 5 by the torque of the middle torsion spring 15, and the support plate 13a of the inverted L-shaped support plate 13 is returned to the state. The inner pad 3 and the hood 2 connected to the pallet 5, the tray 4 and the tray 4 are returned to a horizontal state, and the fruit cup is completely reset.

The present invention can realize functions of stable, continuous conveying, orbital weighing, spectrum detecting, sorting and grading fruits of different sizes ranging from 30 mm to 120 mm in diameter. The trays and support plate are separated, and the weighing legs of the trays passes through the square hole of the pallet, so as to reduce the friction effect of the weighing process of fruits and vegetables, improve the weighing accuracy of fruits and vegetables; the hood and the inner liner are installed on the tray, which can effectively reduce the influence of ambient light on the spectrum detection of fruits and vegetables, and improve the precision of spectral detection; The combination of the inverted L-shaped support plate and the torsion spring improves the turning efficiency of the pallet and the tray, and the turning effect is good; the fruit cup is a single-chain conveying and has two rows of trays, which can effectively improve the production efficiency.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A single-chain double-supported fruit cup device for sorting fruits and vegetables, comprising: a single-chain double-supported fruit cup which is provided on a conveyor track;
   wherein the single-chain double-supported fruit cup comprises:
   a fruit cup support frame (1),
   two hoods (2, 2'),
   two internal liner (3, 3'),
   two trays (4, 4'),
   two pallets (5, 5'), and
   two inverted L-shaped pallets (13, 13');
   wherein the two pallets (5, 5') are rotationally symmetrically hinged on both sides of the cup support frame (1) based on two side pivots (10, 10'), two first side torsion spring (11, 11') and two second side torsion spring (12, 12') are set on the two side pivots (10, 10') and providing torque to the two pallets (5, 5'), two trays (4, 4') are provided on the two pallets (5, 5'), and the two hoods (2, 2') are mounted on two trays (4, 4') for placing spherical fruits; the two inverted L-shaped pallets (13, 13') are rotationally symmetrically hinged on the fruit cup support frame (1) by the intermediate shaft (14), and the two inverted L-shaped pallets (13, 13'-) extend towards the two pallets (5, 5') on both sides and are cooperatedly connected, two medium torsion spring (15, 15') are set on the intermediate shaft (14) providing torque to the two inverted L-shaped pallets (13, 13').

2. The single-chain double-supported fruit cup device for sorting fruits and vegetables, as recited in claim 1, wherein the fruit cup support frame (1) comprises a panel (1a) on a top portion and a base (1b) on a bottom; the two pallets (5, 5') are respectively hinged on two sides of the panel (1a) of the fruit cup support frame (1) by corresponding the two side pivots (10, 10'); the two pallets (5, 5') are symmetrically provided along the fruit cup support frame (1); the two side pivots (10, 10') respectively pass through a first side torsion spring (11), a second side torsion spring (12), a third side torsion spring (11') and a fourth side torsion spring (12'); wherein both sides of the first side torsion spring (11), the second side torsion spring (12), the third side torsion spring (11') and the fourth side torsion spring (12') are respectively connected with the two pallets—(5, 5') and the panel (1a) of the fruit cup support frame (1).

3. The single-chain double-supported fruit cup device for sorting fruits and vegetables, as recited in claim 2, wherein the side torsion springs (11, 12, 11',12') provide the pallets (5, 5') with a torque in an opposite direction to the gravity (G1) torque during articulation rotation, thereby realizing a result that rotation overturning process against gravity (G1) of the pallets (5, 5') is gentle.

4. The single-chain double-supported fruit cup device for sorting fruits and vegetables, as recited in claim 1, wherein the two inverted L-shaped pallets (13, 13') are hinged on a middle portion of end faces of the panel (1a) of the fruit cup support frame (1) by a same intermediate shaft (14) and forming a articulation rotation; medium torsion springs (15, 15') are sleeved on the intermediate shaft (14) between each of the inverted L-shaped support plates (13, 13') and the panel (1a) of the fruit cup support frame (1); both ends of the medium torsion springs (15, 15') are respectively connected with the panel (1a) of the support frame (1) and the two inverted L-shaped support plates (13, 13').

5. The single-chain double-supported fruit cup device for sorting fruits and vegetables, as recited in claim 4, the medium torsion spring (15, 15') provides the two inverted L-shaped support plate (13, 13') with an identical direction of gravity as a gravity (G2) torque during articulation rotation, and realizes that rotation overturning process against gravity (G1) of the two inverted L-shaped support plates (13, 13) ') is gentle.

6. The single-chain double-supported fruit cup device for sorting fruits and vegetables, as recited in claim 1, wherein a top of the hood (2) is mainly spliced by a plurality of fan-shaped shielding plates (2a); the fan-shaped shielding plates (2a) form a circle to form a hollow torus; gaps are preset among adjacent fan-shaped shielding plates (2a); the hood (2) snaps into the circular groove (2b); a convex (4e) matching with the circular groove (2b) is provided on a top of the tray (4); the top of the tray (4) is provided on a bottom portion of the hood (2) to make the convex (4e) embedded in the circular groove (2b) to form an axial limit.

7. The single-chain double-supported fruit cup device for sorting fruits and vegetables, as recited in claim 1, wherein four weighing legs (4a, 4b, 4c, 4d) are provided on a lower end of the tray (4); four square holes (5a, 5b, 5c, 5d) respectively corresponding to the four weighing legs (4a, 4b, 4c, 4d) are respectively provided on an upper portion of the pallet (5); when the lower portion of the tray (4) is connected with the upper portion of the pallet (5), the four weighing legs (4a, 4b, 4c, 4d) respectively pass downwardly through corresponding four square holes (5a, 5b, 5c, 5d) to form locations for installing; after the four weighing legs (4a, 4b, 4c, 4d) pass through corresponding square holes (5a, 5b, 5c, 5d), limit pins (6, 7, 8 and 9) are installed on feed ends of the four weighing legs (4a, 4b, 4c, 4d); sizes of the four square holes (5a, 5b, 5c, 5d) are smaller than the limit pins (6, 7, 8 and 9); a slope guide track (26) provided in parallel with the conveyor track is provided on a lower portion of the pallets (5); two side faces of the slope guide track (26) are inclined surfaces which are inclined downwardly, a top surface between the inclined surfaces is a plane, an orbital weigher (22) is provided on the top surface; when the conveyor track transports the fruit cup support frame (1) to move for driving the pallet (5) to move above a top surface of the slope guide track (26), the weighing legs (4a, 4b, 4c, 4d) on the lower end of the tray (4) are guided by the inclined surface of the slope guide track (26) to raise a height, in such a manner that there is a vertical distance between the lower end of the tray (4) and the upper end of the pallet (5); and the weighing legs (4a, 4b, 4c, 4d) fall on the orbital weigher (22), thereby realizing that the orbital weigher (22) weighs and only weighs a weight of the hood (2), the internal liner (3), the tray (4) and the spherical fruit (18).

8. The single-chain double-supported fruit cup device for sorting fruits and vegetables, as recited in claim 1, wherein the pallet (5) mainly comprises a circular pallet (5f) and a—support leg (5e) which are in rigid connection; the two side pivots (10, 10') are provided on a connection of the support leg (5e) and the circular pallet (5f); and the connection is hinged on a panel (1a) of the fruit cup support frame (1) via the two side pivots (10, 10'), the support leg (5e) and the circular pallets (-5f) are connected at an obtuse angle;

wherein the inverted L-shaped support plate (13) is mainly formed by rigidly connecting a support plate (13a) and a dial plate (13b), and a intermediate shaft (14) is provided at a joint between the support plate (13a) and the dial plate (13b); the joint is hinged to the panel (1a) of the fruit cup support frame (1) through the intermediate shaft (14); the support plate (13a) and the dial plate (13b) are connected at an acute angle, and the dial plate (13b) is provided to extend to the pallet (5), and connected to the support leg (5e) of the pallet (5).

9. The single-chain double-supported fruit cup device for sorting fruits and vegetables, as recited in claim 8, when the inverted L-shaped support plate (13) is only subjected to gravity torque, the dial plate (13b) is in close contact with a vertical side face of the base (1b) of the fruit cup support frame (1), and an end portion of the support plate (13a) is connected to a portion between an intermediate branch arm of the support leg (5e) and a short arm of the main body portion; and a surface of the support plate (13a) and the intermediate branch arm surface of the support leg (5e) are in close contact with each other, in such a manner that the support plate (-13a) supports the support leg (5e); an angle θ formed by the support plate (13a) and a main portion of the supporting leg (5e) is greater than 90°, and the circular pallet (5f) is arranged in a horizontal state.

10. The single chain double-supported fruit cup device for sorting fruits and vegetables, as recited in claim 8, wherein when the inverted L-shaped support plate (13) is subject to an anti-gravity torque, the dial (13b) rotates away from a vertical side face of the base (1b) of the fruit cup support (1), and the support plate (13a) rotates away from the support leg (5e); the circular support plate (5f) tilts and reverses under action of its own gravity torque and gravity torque of the tray (4), the internal liner (3), the hood (2) and the spherical fruit (18); the spherical fruit (18) on the circular support plate (5f) is dropped sideways to achieve grading the spherical fruit (18).

11. The single chain double-supported fruit cup device for sorting fruits and vegetables, as recited in claim 8, wherein when the inverted L-shaped support plate (13) is restored by its own gravity torque and externally force from reset station (D), the surface of the dial plate (13b) is connected to the short arc of a main body portion of the support leg (5e), and the support leg (5e) is pressed onto a bottom surface of the panel (1a) of the fruit cup support frame (1).

12. The single-chain double-supported fruit cup device for sorting fruits and vegetables, as recited in claim 8, wherein the conveyor track comprises a transmission chain (19), a track (20), a track profile (21) and an orbital weigher (22); and the track (20) is fixedly provided on the track profile (21), and the transmission chain (19) is mounted on the track (20) and moved along the track (20), the base (1b) of the fruit cup support frame (1) is mounted and connected to the transmission chain (19), and the fruit chain support frame (1) is driven by the transmission chain (19), and thereby driving transmission of the single-chain double-supported fruit cup.

13. The single-chain double-supported fruit cup device for sorting fruits and vegetables, as recited in claim 12, wherein a section of the transmission chain (19) located at a grading outlet position is provided with an electromagnetic dialing assembly; the electromagnetic dialing assembly comprises an electromagnet (17) and a grading plate (16), wherein the electromagnet (17) is connected with the grading plate (16), and the electromagnet (17) controls the rotation of the classifying plate (16) to push the inverted L-shaped support plate (13, 13') to rotate against the torque generated by self-gravity torque and rotation torsion formed by rotation of the medium torsion spring (15, 15').

* * * * *